United States Patent Office 3,374,182
Patented Mar. 19, 1968

3,374,182
CAUSTIC-TREATED ZEOLITES
Dean Arthur Young, Yorba Linda, Calif., assignor to Union Oil Company of California, Los Angeles, Calif., a corporation of California
No Drawing. Filed May 22, 1964, Ser. No. 369,611
8 Claims. (Cl. 252—455)

ABSTRACT OF THE DISCLOSURE

Adsorptive capacity and porosity of certain silica-rich zeolites, e.g. mordenite, are improved by digestion with aqueous caustic solutions to leach out a minor proportion of structural silica, without significantly altering crystal structure.

*Background and summary of the invention*

This invention relates to new crystalline zeolites useful as adsorbents and catalysts, or catalyst bases, and to methods for their manufacture. In brief, these new zeolites are derived from a well known class of natural and/or synthetic alumino-silicates having high silica/alumina mole-ratios of between about 6 and 12, e.g., mordenite, and are prepared therefrom by a novel etching or corroding treatment with aqueous caustic solutions. These high-silica zeolites are characterized by an elongated, fibrous crystal structure and relatively small crystal pore diameters in the range of about 3 to 8 angstroms. The caustic etching treatment is found to increase the adsorption rate and effective capacity of the zeolites, as well as their catalytic activity, apparently by corroding the crystallite structures with resultant partial leaching out of silica whereby the internal pore structure is rendered more accessible.

The invention also contemplates that the zeolitic cation content of the zeolites may be modified in accordance with the intended use. For use as adsorbents for hydrocarbons or the like, the zeolitic cation content is relatively non-critical, and may comprise alkali metals, alkaline earth metals, ammonium ions, hydrogen ions, or the like. Where catalytic uses are contemplated, the nature of the zeolitic cations is more critical. For hydrogenation catalysts, a portion of the cations may comprise a Group VIII metal such as nickel, the remainder being alkali metal and/or alkaline earth metal. For cracking, hydrocracking, isomerization, and the like, which require an acidic function, the zeolite is preferably converted to a hydrogen form by acid-washing, or by ion exchange with ammonium salts followed by heating to decompose the zeolitic ammonium ion. There is some uncertainty as to whether the heating of the ammonium zeolites produces a hydrogen zeolite or a "decationized" (cation-deficient) zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metal-cation-deficient."

In recent years there has been a considerable development in the field of catalytic cracking, hydrocracking and other hydrocarbon conversions employing crystalline zeolite catalysts. In general however, this development has been limited to the use of alumino silicate zeolites having $SiO_2/Al_2O_3$ mole-ratios below about 6. Examples of such zeolites are the X molecular sieves, having a $SiO_2/Al_2O_3$ mole-ratio of about 2.5, and the more recently developed "Y" molecular sieves which have $SiO_2/Al_2O_3$ ratios between about 3 and 6. The X molecular sieves are relatively inactive in their sodium forms for promoting acid-catalyzed reactions such as cracking, and all attempts to remove the zeolitic sodium so as to form a hydrogen zeolite have resulted in complete collapse of the crystal structure and marked lowering of the activity. The Y molecular sieves constitute a distinct improvement over the X sieves in that the Y sieves can readily be converted to the hydrogen and/or decationized forms without collapse of the crystal structure, and the resulting acid zeolite is very effective as a cracking catalyst, or a base for hydrocracking catalysts. The principal deficiency of the Y molecular sieve catalysts, in their hydrogen or decationized forms, resides in their relative instability in the presence of water or water vapor at high temperatures; hydrolytic damage resulting in destruction of crystal form takes place fairly rapidly at temperatures above about 400° F.

The high-silica zeolites of this invention possess the outstanding advantage that they can readily be converted to metal-cation-deficient forms which are extremely resistant to hydrolytic damage; in fact, it has been observed in some cases that the hydrogen and/or decationized forms are more stable than the corresponding sodium zeolites. Notwithstanding the excellent thermal and hydrolytic stability of the high-silica metal-cation-deficient zeolites, they have to date found very limited use as catalyst bases, mainly because the crystal pores are considerably smaller than those of the X or Y molecular sieves. The small pore diameters place severe restrictions upon access to active catalytic surfaces by cyclic hydrocarbons, particularly polycyclic hydrocarbons.

Mordenite is a prime example of a high-silica zeolite having excellent stability, but relatively restrictive pore diameters. The crystal structure of this material as determined by Meir (Z. fur Krist. 115, 439, 1961) is orthorhombic with relatively large pores of about 6.6 A. in diameter running parallel to the fiber axis of the crystals, in arrangement similar to a bundle of tubes. Smaller cross-connecting channels are 2.8 A. in diameter. In natural mordenite the effective diameter of the larger pores is frequently reduced to around 4 A. by stacking faults which tend to choke off the tubes. Synthetic mordenites can be prepared (Chem. Eng. News, Mar. 12, 1962, p. 52) which do not contain appreciable stacking faults, but even without such faults, the length of the fibrous crystals is usually several microns so that the length/diameter (l./d.) ratio of the larger channels is still very high. Even assuming a crystal length of only 1.0 micron, the l./d. ratio of the larger pores would be approximately 1,500. These long narrow pores are susceptible to plugging, and very few stacking faults would effectively reduce the sorptive capacity for molecules larger than ethane.

It has now been found that by subjecting high-silica zeolites such as mordenite to the aqueous caustic treatment of this invention, the adsorptive capacity and catalytic activity of catalysts prepared therefrom can be materially improved. At the same time it is found that the crystal structure remains stable, and the hydrogen and/or decationized zeolites prepared from the caustic treated zeolites still retain the high degree of thermal and hydrolytic stability dissplayed by the original zeolite. The favorable effect of the caustic treatment is not completely understood, but it would appear to be attributable to the increased accessibility of the internal pore structure brought about when the sides of the fibrous crystals have been corroded or partially dissolved by leaching out a minor proportion of the structural silica. Other factors may also be involved such as peptizing of the crysctals, or a reduction in particle size. By either of these mechanisms it would appear that the caustic treatment increases the number of accessible pore mouths without decreasing the crystallinity. The diffusion limitations imposed by the above-noted stacking faults, and high l./d. ratios of the internal pores are greatly reduced.

The high-silica zeolites of this invention may be characterized by the following empirical formula:

$$(M_{2/n}O)_x:Al_2O_3:(SiO_2)_y:(H_2O)_z \qquad (I)$$

wherein M is a monovalent metal, a divalent metal or hydrogen, $n$ is the valence of M, $x$ is a number from about 0.1–2, $y$ is a number from about 6–12, and $z$ is a number from 0 to about 12. Normally such zeolites as found in nature, or as prepared by synthetic methods, are initially in an alkali metal and/or alkaline earth metal form, usually the sodium form. Examples of such zeolites are mordenite, stilbite, heulandite, ferrierite, dachiardite, chabazite and erionite.

The preferred zeolite for use herein is mordenite, and still more preferably synthetic mordenite, any of which may be characterized by the following general formula:

$$(M_{2/n}O)_x:Al_2O_3:(SiO_2)_y:(H_2O)_z \qquad (II)$$

wherein $y$ is about 9–10, and M, $n$, $x$ and $z$ have the same significance as above. The sodium mordenites may be identified by their X-ray powder diffraction pattern, the major spacings being within about ±3% of the following values (the strongest lines being designated "s"):

TABLE 1

*X-ray diffraction spacings in A.*

13.4
8.85s
6.50s
5.70
4.50s
3.98s
3.41s
3.15
2.89
2.68
2.51
2.44
2.01
1.94

The synthetic methods for preparing mordenite, and other high-silica zeolites, generally involve aging an aqueous solution of sodium aluminate and sodium silicate at elevated temperatures. The initial gel which forms is transformed to the crystalline zeolite during the aging period, and the final $SiO_2/Al_2O_3$ mole-ratio therein depends upon the concentration and proportions of reactants. It is inherent in such methods that the final zeoltie will have undergone a substantial period of contact with the alkaline mother liquors. It is important to observe however that these mother liquors, which normally have a pH in the range of about 9–10, and contain substantial amounts of silica, do not bring about the critical leaching or etching action herein required. To obtain the desired etching effect, with removal of structural silica from the crystals, it is necessary to employ caustic solutions having a pH in excess of about 10.5, and wherein the mole ratio of metal hydroxide to $SiO_2$ is greater than about 2.0.

The caustic treating solutions employed herein are preferably composed essentially of alkali metal hydroxides, preferably sodium hydroxide, dissolved in water. However, other alkaline, alkali metal salt solutions may be employed such as sodium carbonate solutions, provided the pH is above 10.5. Suitable concentrations of alkali metal hydroxide solutions range between about 0.1 and 15 N, preferably between about 1 and 10 N.

The severity of the caustic treatment should be regulated so as to leach out from the zeolite a significant proportion of the structural silica content thereof, normally between about 0.5% and 40% thereof. The optimum extent to which the leaching is continued depends upon several factors, principally the use to which the resulting zeolite is to be put, and the initial $SiO_2/Al_2O_3$ mole-ratio therein. For high-silica zeolites such as mordenite it is feasible to leach out relatively more of the silica while still retaining crystal structure than is feasible in the case of zeolites where the silica content is initially lower, e.g., 6/1 as in the case of heulandite. Where the product is to be employed as an adsorbent, it is normally desirable to preserve crystal structure to the maximum extent, and for this purpose it is usually desirable to leach out no more than about 10% of the silica. Where the product is to be used as a base for catalysts, maximum retention of crystallinity is not as essential, and hence the preferred range of silica removal is between about 1% and 20%. In all cases however it is preferred to retain a final $SiO_2/Al_2O_3$ mole-ratio greater than about 5.5; this obviously places more restrictions upon the severity of the caustic treatment as applied to the low-silica zeolites than to the high-silica materials such as mordenite. It is preferred also to limit the severity of the treatment so that not more than about 5% of the $Al_2O_3$ content is removed.

The overall severity of the caustic treatment is a function of the three variables, caustic concentration, temperature of treatment, and length of time the treatment is continued. With solutions of the concentration previously specified, the desired etching effect can be obtained at temperatures between about 0° and 100° C. in times ranging between about 5 minutes and 5 hours. Moderate temperatures in the range of about 25–75° C. are normally preferred, particularly in the case of synthetic zeolites which are free of stacking faults such as synthetic mordenite. Treatment at higher temperatures tends to produce stacking faults in these materials, and in any case is likely to bring about undesired fundamental changes in crystal structure, with formation of amorphous material and/or less stable crystalline zeolites.

Following the caustic treatment, the zeolite is filtered off and washed with water to remove excess alkali. The resulting sodium zeolites may be used as such for adsorbents, or for some types of catalyst bases. As indicated above, the nature of the zeolitic cations present has a profound effect upon the activity of catalysts prepared therefrom. For simple hydrogenation processes where cracking and isomerization reactions are undesired, it is normally preferred to use a zeolite base of minimum acidity, e.g., the alkali metal and/or alkaline earth metal forms. Where cracking, hydrocracking and/or isomerization reactions are desired, catalysts of maximum acidity may be desirable, and for these purposes it is preferred to employ a zeolite base wherein at least about 30%, and preferably at least 75%, of the zeolitic ion-exchange sites are decationized or satisfied by hydrogen ions. Zeolite bases of this character are prepared by exchanging the sodium zeolite with aqueous solutions of ammonium salts, then draining, drying and calcining the resulting ammonium zeolites at temperatures of, e.g., 600–1,100° F. in order to decompose the ammonium ions and leave hydrogen ions in their place, and/or to effect decationization. Obviously, catalysts of any desired degree of acidity may be prepared by simply controlling the degree of initial ammonium ion exchange. Catalyst bases of intermediate acidity, wherein for example 10–30% of the ion exchange sites are decationized and/or satisfied by hydrogen ions, may be preferred for conversions such as naphtha reforming, dealkylation or the like.

In many instances, as, e.g., in the case of mordenite, it will be found that the hydrogen zeolites can be prepared even more simply by simply subjecting the sodium zeolite to acid leaching. For this purpose it is desirable to employ fairly dilute acid solutions, as for example 1 N hydrochloric acid, or acetic acid.

Zeolite bases of intermediate acidity usually result when the zeolitic cations are mainly divalent metals such as magnesium or other alkaline earth metal. The introduction of divalent metal ions into the crystal lattice apparently creates dipole moments therein, giving the effect of weak acidity. Such divalent metal zeolites are useful as mild cracking, hydrocracking and/or isomerization catalyst bases, as well as dealkylation catalyst bases. The divalent metal zeolites may be prepared by conventional methods involving ion-exchange with aqueous solutions of divalent metal salts, as for example magnesium chloride.

With the zeolitic cationic content of the zeolites adjusted as desired, any desired hydrogenating component may be added by procedures which give a sufficiently homogeneous distribution thereof. Ordinary impregnation with aqueous solutions of suitable salts of the desired metal may be employed. Preferably however the hydrogenating metal is added by ion exchange so as to become a part of the zeolitic cation content thereof. To effect such ion exchange, the zeolite, either in a metal or ammonium form, or a hydrogen form, is digested with an aqueous solution of the desired metal salt wherein the metal appears in the cation, e.g., nickel nitrate or tetrammine palladium chloride. Suitable proportions of hydrogenating metal in the finished catalyst may range between about 0.1% and 20% by weight.

The preferred hydrogenating metals are the Group VIII noble metals, particularly palladium, platinum, rhodium and iridium, used in amounts of about 0.2 to 2% by weight. Other specifically contemplated hydrogenating metals include nickel, cobalt, iron, molybdenum and tungsten. Any of these metals may be present in the free state, or as oxides, sulfides or other compounds. In most cases, it is found that maximum activity is obtained by presulfiding the catalyst and then reducing with hydrogen to form the free metal.

The hydrocatalytic conversions in which the above catalysts may be used are in general carried out at elevated temperatures of about 300–900°F., pressures of 300–3,000 p.s.i.g., liquid hourly space velocities of about 0.2 to 10, using hydrogen in proportions of about 200–20,000 s.c.f./b. of feed. It will be understood however that the selection of specific operating conditions within these broad ranges will depend upon the particular type of conversion which is desired, as well as the specific catalyst employed.

For use as adsorbents, the treated zeolites of this invention may be used under conventional conditions involving contact of the feed mixture with a fixed or moving bed of the adsorbent, generally at relatively low temperatures of, e.g., 50–200° F. and at atmospheric or superatmospheric pressures. The zeolites in general adsorb polar compounds such as alcohols, amines, ketones and the like in preference to relatively non-polar compounds such as hydrocarbons. Aromatic hydrocarbons are generally adsorbed in preference to non-aromatic hydrocarbons of the same molecular size. Due to the relatively small crystal pore diameters, small molecular species are adsorbed in preference to larger molecules of the same chemical genus; and straight-chain paraffins and olefins in preference to the branched-chain species. The effect of the caustic etching treatment in all these cases is to increase the rate of adsorption and the effective capacity for the selectively adsorbed compounds. Regeneration of the rich adsorbent may be effected by conventional means, as, e.g., steam stripping vacuum desorption, displacement exchange, etc.

The following examples are cited to illustrate more specifically the preparation and use of catalysts and adsorbents of this invention, but are not to be construed as limiting in scope:

EXAMPLE I

Two palladium hydrogen mordenite catalysts were prepared from a synthetic sodium mordenite (Norton Company, "Zeolon") originally containing 7.3 weight-percent $Na_2O$, and having a $SiO_2/Al_2O_3$ mole-ratio of 9.52. The procedures were as follows:

*Catalyst A.*—A sample of the sodium mordenite was aged 16 hours at 205° F. in a 1.8 N aqueous sodium hydroxide solution. The ratio of solution to mordenite was 1.0 ml. per gram. The caustic treatment decreased the silica/alumina mole-ratio from 9.5 to 9.17, without significant removal of $Al_2O_3$. The caustic treated mordenite was then washed and subjected to ion exchange with 5 successive batches of 10% ammonium nitrate solution, to reduce the $Na_2O$ content to 0.22 weight-percent. The resulting ammonium mordenite was filtered, dried and exchanged with tetrammine palladium nitrate solution to add 0.5% Pd. The palladium containing mordenite was filtered and dried at 110° C. and was then mixed with a freshly prepared palladium sulfide sol to add an additional 0.5% Pd. The preparation was completed by redrying, pelleting and activating by reducing for 24 hours in hydrogen and oxidizing for 16 hours at 875° F. in air.

*Catalyst B.*—Was prepared in the same manner as catalyst A except that the caustic treatment was omitted. In this case the five-stage ion exchange with ammonium nitrate solution reduced the $Na_2O$ content to 0.20 weight-percent.

EXAMPLE II

To compare the hydrocracking activity of catalysts A and B, both catalysts were employed in parallel hydrocracking tests using as feed a hydrofined gas oil having the following characteristics:

| | |
|---|---|
| Gravity, ° API | 34.9 |
| Aromatics, vol. percent | 25 |
| Olefins | 1 |
| Saturates | 74 |
| Boiling Range, ° F. | 390–820 |

The catalysts were tested at two temperature levels of 550° F. and 600° F., and at 1,000 p.s.i.g., 4.0 LHSV, and 20,000 s.c.f. of hydrogen per barrel of feed. Product gravities were then measured, and conversion to 300° F. end-point gasoline was calculated by the equation, percent conversion=6.1 (° API—34.9), which had previously been found to be a valid relationship for determining conversion when hydrocracking this particular feedstock over mordenite catalysts. The results were as follows:

TABLE 2

| Catalyst | A | B |
|---|---|---|
| $SiO_2/Al_2O_3$ ratio | ¹ 9.17 | ² 9.52 |
| Hrs. on stream | 1.2 | 1.2 |
| Temp., ° F | 550 | 550 |
| Product Gravity, ° API | 37.8 | 35.9 |
| Conversion, vol. percent | 18 | 6 |
| Hrs. on stream | 5–20 | 4–20 |
| Temp., ° F | 600 | 600 |
| Gravity, ° API | 39.7 | 36.3 |
| Conversion, vol. percent | 29 | 9 |

¹ Caustic treated.
² No caustic treatment.

It is thus apparent that the caustic treatment increased the activity of catalyst A about three-fold, as compared to catalyst B.

EXAMPLE III

In order to compare the effect of caustic treatment on adsorption capacity and crystallinity, two additional hydrogen mordenite zeolites were prepared from Norton Company sodium "Zeolon." The respective hydrogen zeolites were prepared as follows:

*Zeolite C.*—One sample of Zeolon was combined with aqueous 20% sodium hydroxide solution in a 12" Cincinnati muller using 100 ml. of solution per 200 gm. of powder. The thick paste was mixed for 30 minutes at room temperature and then thinned with water, filtered, and washed. The sodium mordenite was exchanged four times with 20% ammonium chloride solution until the sodium content was 0.2% $Na_2O$. The ammonium mordenite was calcined 16 hours at 540° C. in order to drive off ammonia and form the hydrogen mordenite.

*Zeolite D.*—Was prepared in the same manner as zeolite C except that the initial treatment with sodium hydroxide was omitted.

Both zeolites C and D were then tested for benzene adsorption capacity by allowing samples to come to equilibrium with benzene vapor at 100 millimeters pressure in an Aminco Thermograv balance. Intensity of the major X-ray diffraction lines was also determined in order to measure relative crystallinity. The results were as follows:

TABLE 3

| Zeolite | C [1] | D [2] |
|---|---|---|
| Benzene adsorption, wt. percent | 8.5 | 6.5 |
| X-ray Diffraction Intensity (relative) Spacing, A.: | | |
| 9.11 | 52 | 47 |
| 6.55 | 37 | 34 |
| 3.97 | 45 | 50 |
| 3.45 | 66 | 65 |
| 3.37 | 37 | 34 |
| 3.22 | 42 | 41 |
| Summed Intensity | 279 | 271 |

[1] Caustic treated.
[2] No caustic treatment.

It is thus apparent that the caustic treatment materially improved the benzene adsorption capacity, and also brought about a slight increase in apparent crystallinity.

Results analogous to those indicated in the above examples are obtained when other high-silica zeolites are substituted for the mordenite. It is therefore not intended that the invention be limited to the details of the examples, but broadly as defined in the following claims.

I claim:
1. A method for the manufacture of silica-rich, adsorbent, crystalline zeolites of improved porosity, which comprises digesting a silica-rich alumino silicate zeolite precursor with an aqueous alkali metal hydroxide solution having a pH above about 10.5 at a temperature between about 0° and 100° C. for a sufficient length of time to leach out between about 0.5% and 10% of the structural silica content thereof, and recovering therefrom said crystalline zeolite of improved porosity, having essentially the same crystal structure as said zeolite precursor and having a $SiO_2/Al_2O_3$ mole-ratio above about 5.5, said zeolite precursor having the formula:

$$(M_{2/n}O)_x : Al_2O_3 : (SiO_2)_y : (H_2O)_z$$

wherein M is selected from the class consisting of monovalent metals, divalent metals and hydrogen, $n$ is the valence of M, $x$ is a number from about 0.1 to 2, $y$ is a number from about 6 to 12 and $z$ is a number from 0 to about 12.

2. A method as defined in claim 1 wherein said aqueous caustic solution is essentially sodium hydroxide dissolved in water.

3. A method as defined in claim 1 wherein said zeolite precursor is mordenite.

4. A method for the manufacture of stable, crystalline, hydrogen zeolite adsorbents of improved porosity which comprises digesting a silica-rich alumino silicate zeolite precursor with an aqueous alkali metal hydroxide solution having a pH above about 10.5 at a temperature between about 0° and 100° C. for a sufficient length of time to leach out between about 0.5% and 10% of the structural silica content thereof, then subjecting the resulting metal zeolite to ion exchange to replace a substantial proportion of the zeolitic metal content thereof with hydrogen ions, and recovering therefrom said hydrogen zeolite of improved porosity, having essentially the same crystal structure as said zeolite precursor and having a $SiO_2/Al_2O_3$ mole-ratio above about 5.5, said zeolite precursor having the formula:

$$(M_{2/n}O)_x : Al_2O_3 : (SiO_2)_y : (H_2O)_z$$

wherein M is selected from the class consisting of monovalent metals, divalent metals and hydrogen, $n$ is the valence of M, $x$ is a number from about 0.1 to 2, $y$ is a number from about 6 to 12 and $z$ is a number from 0 to about 12.

5. A method as defined in claim 4 wherein said aqueous caustic solution is essentially sodium hydroxide dissolved in water.

6. A method as defined in claim 4 wherein said zeolite precursor is mordenite.

7. A method as defined in claim 4 wherein said ion exchange is carried out by treating said metal zeolite with aqueous acid.

8. A method as defined in claim 4 wherein said ion exchange is carried out by treating said metal zeolite with an ammonium salt solution to form the corresponding ammonium zeolite, followed by heating to decompose the ammonium zeolite and form a corresponding hydrogen zeolite.

References Cited

UNITED STATES PATENTS 3,326,797    6/1967    Young   ----------   252—455 X

DANIEL E. WYMAN, *Primary Examiner.*

C. F. DEES, *Assistant Examiner.*